Oct. 20, 1942.                A. RAHN                2,299,652
                    APPARATUS FOR FINGER PRINTING
                       Filed June 22, 1939

Inventor
ANDREW RAHN
By
Parker & Burton
Attorneys

Patented Oct. 20, 1942

2,299,652

UNITED STATES PATENT OFFICE 2,299,652

APPARATUS FOR FINGERPRINTING

Andrew Rahn, Detroit, Mich.

Application June 22, 1939, Serial No. 280,624

13 Claims. (Cl. 41—4)

My invention relates to an improved method of establishing insurance protection for a limited period and to improved apparatus and mechanism whereby the same may be carried out.

An object is to provide an improved method for establishing insurance protection for a large number of individuals at a minimum cost, and whereby each individual insured is given an identifying coupon indicating the character, amount, and time of insurance, and a permanent identifying record is made and kept for the company issuing the insurance, whereby the identity of the individual insured is established beyond question.

I propose to provide a system so characterized and arranged that an insurance policy for a determined period and covering a stated risk may be delivered by a merchant, or other vendor, to each purchaser of a predetermined amount of merchandise, with substantially the same facility and rapidity that a sales slip or coupon identifying the purchase is delivered, and without any appreciably greater expense or labor being involved, and whereby a permanent identification of the purchaser and insured is made and kept inviolate against tampering or molestation.

Another object is to provide improved means whereby identification of the purchaser and insured may be rapidly taken at the time of the delivery of the insurance policy coupon and kept for reference later to identify the insured should a claim be made under the policy.

Another object is to provide means, in the form of a small self-contained portable device, containing a plurality of identifying insurance coupons so arranged therein as to be capable of being individually withdrawn and detached for delivery to each purchaser of merchandise or other persons to receive the same and each of which coupons identifies the holder of the coupon as being insured for the period and in the amount as described on such coupon.

In addition to the detachable insurance policy coupons which are delivered to the insured, the mechanism contains permanent record coupons corresponding in number and identified in a suitable manner with the detachable insurance policy coupons, which permanent record coupons remain in the machine and are not detached. These permanent record coupons are so constructed that each provides a place for finger prints to be made of the party to whom the corresponding detachable insurance coupon is issued. There is a permanent record coupon corresponding in identification with each detachable insurance coupon. Upon the issuance of the detachable insurance coupon a finger print of the insured is taken upon the permanent record coupon. This permanent record coupon is then advanced to a point of concealment and protection within the container by mechanism arranged to accomplish this object and it is maintained therein against molestation for use in identification of a policy holder presenting a claim.

An important feature of the invention resides in the finger printing arrangement, which is of such a character that finger prints may be taken without leaving any smudge or smear on the finger registered. This improved arrangement permits the recordation of finger prints for any or all of the customary purposes with a nice degree of accuracy as to the minute delineation of the print and to eliminate the necessity of smudging or soiling the fingers in any way during the process of recordation. In its broadest aspects this phase of the invention consists in the use of a recording surface, having impregnated therein some suitable color indicator which is adapted to react chemically with a determined solution. Such a practice would be particularly desirable in achieving commercial success with this system.

The case or container within which the policy coupons are kept and from which the detachable coupons are delivered to the insured and wherein the permanent record coupons are maintained for future reference, is a small and readily portable one so that it may be transported by the party operating the same, such as the attendant at an oil and gas station, who might issue an insurance coupon for a limited period as against accident or injury to each purchaser of a determined amount of gasoline. It is of such a size and weight that it is easily held in the palm of the hand.

The paper roll from which the insurance coupons are detached for delivery to the insured and of which the permanent record coupons form a part is located within the portable container. The coupons, detachable and permanent, may form complementary parts of a continuous runner arranged on opposite sides of a longitudinal line of the runner. The runner is supported in some suitable manner as over manipulable rollers for lengthwise advancement. The arrangement is such that the detachable insurance coupons may be readily withdrawn and detached for delivery to an insured and finger prints may be taken on the permanent record coupons corresponding with the detachable insurance coupons, and these permanent record coupons advance to a place of protected isolation within the container where they may be preserved for reference in case of an insurance claim being later made. The detachable coupons and the permanent record coupons may be formed on separate continuous runners, and provision may be made for advancing both runners at the same time so that the corresponding coupons on the separate runners appear for use together.

When the insurance policy coupons and the permanent record coupons form part of a continuous runner, the insurance record coupons may be arranged on one side of a longitudinal line of the runner and the permanent record coupons arranged on the opposite side of said longitudinal line. A preferable arrangement is for the lines to be in the form of a weakened line of perforation and for the detachable record coupons to be separated from each other by weakened transverse lines of severance.

Figure 5:
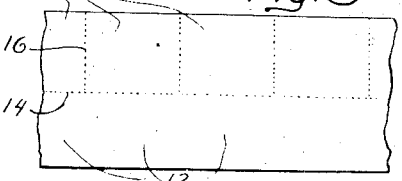
Figure 5 shows a portion of the roll of paper carrying the coupons.

In the carrying out of my invention I provide a runner of paper which is arranged in a roll, though the same may be disposed in any suitable manner such as in flat folded pack form. As stated, an important feature of the invention resides in the character of paper utilized. This will be described more fully hereinafter. This runner of paper as shown in Figure 5 may be divided by a longitudinal line into two longitudinal sections. One longitudinal section is made up of a series of detachable coupons indicated as 10. Each coupon is printed to indicate the character of insurance provided. The other section of the runner is made up of a series of coupons. These coupons are similarly identified with the detachable coupons and are known as permanent record coupons. In the drawing they are indicated by the numeral 12. The coupons are provided in pairs. That is, a permanent record coupon and a detachable coupon make up each pair of coupons. The permanent record coupons form an unbroken runner record which is kept in the machine. The longitudinal line is here indicated as a line of weakness, being a perforated line 14. The detachable coupons are separated from each other by transverse lines of weakness 16.

The machine or container within which the runner is disposed comprises a base of box like formation 18 and a removable top member or closure 20. Detents 22 are provided to removably lock the closure in place on the base. The top member or closure 20 is provided with an opening at one end into which the pan 24 is seated. The pan 24 has a flange 26 that rests upon the top to support the pan and the pan itself serves as a carrier for finger print material such as a pad 28.

Figure 2:
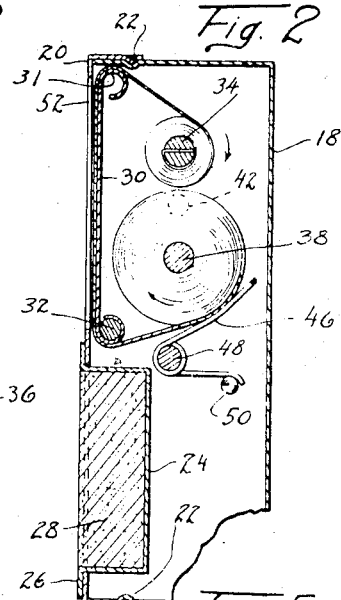
Figure 2 is a cross sectional view taken on 2—2 of Figure 1.

The top member 20 is provided with an opening at the opposite end of the container adjacent the pan which is divided into two spaces or openings. Underneath these spaces or openings is a table 30. This table is supported upon a pin or cross piece 32 at one end thereof. The edge of the table at the end is bent or curled around the pin as shown in Figure 2. This will aid in the feeding of the continuous runner upon the top surface of the table as will be later described.

Figure 3:
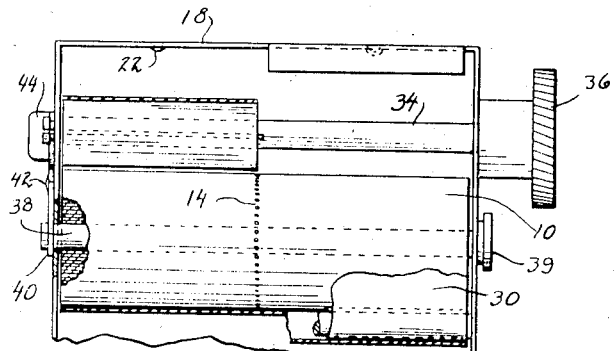
Figure 3 is a partial plan with cover removed, and partially broken away.
Figure 4:
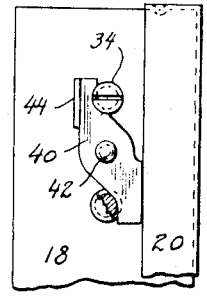
Figure 4 is a fragmentary elevation of a portion of a side of the container showing roll locking mechanism.
Figure 6:
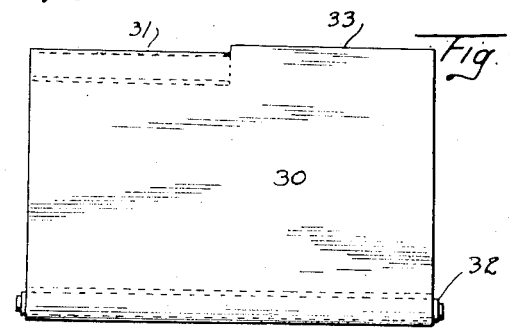
Figure 6 shows the table over which the paper runner travels.

Within the base underneath the table are two removable spindles. There is a manipulable spindle 34 which has a knurled knob 36 whereby it may be rotated. There is a free running spindle 38 spaced from the manipulable spindle and having a knob 39. These two spindles are supported within the casing in provided apertures and so that they may be withdrawn for replacement of the roll of paper. To hold the spindles in place there is provided a catch member 40 pivoted upon a support 42 and provided with a thumb piece 44 which is movable into grooves provided in the projecting ends of the spindles 34 and 38 as shown in Figures 3 and 4. Swinging movement of this catch 40 releases both of the spindles so that they may be withdrawn and the roll of paper thereon removed and another roll substituted.

Figure 1:
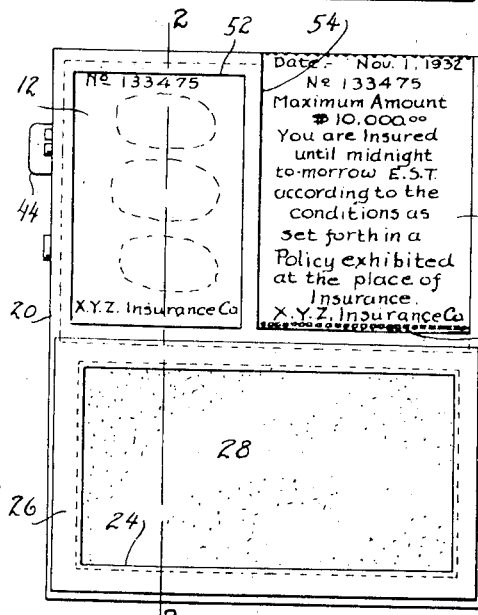
Figure 1 is a plan of the novel apparatus embodying my invention.

The roll of paper shown in Figure 5 is mounted upon the free running spindle 38 and one end thereof is brought over the table 30 and secured to the manipulable spindle 34. There is a brake device in the form of a spring 46 which bears against the roll of paper on the spindle 38. The spring is mounted upon a pin 48 and has a tension arm resting against the pin 50. In the operations of the device manipulation of the spindle 34 advances the runner of paper lengthwise over the table 30 underneath the openings in the closure. The closure is cut away particularly as shown in Figures 1 and 2 so that there is an opening in one side at 52 over the permanent record coupons of the paper runner and an opening on the other side at 54 over the detachable record coupons of the runner. The paper runner passes over the table underneath the closure and the portion 54 of the closure is disposed substantially over the longitudinal line of weakness of the runner dividing the permanent record coupons from the detachable coupons. It will be seen that the runner is held down at one edge by the margin 56 of the closure and that the permanent record side of the runner is wound upon the spindle 34 but that the other side of the runner is advanced outwardly for detachment. It will be seen that the table on one side curves downwardly as at 31 but on the other side projects out flush with the edge of the base of the container as at 33. The permanent record portion of the runner turns downwardly over the curved side 31 and the detachable insurance coupon portion of the runner extends on out over the portion 33 of the table. The two sections are severed from each other as they are advancing in this fashion along the weakened line 14. The permanent record coupons are severed along the transverse lines 16.

In carrying out the finger printing operation it is preferable to incorporate in the paper upon which the finger print is to be recorded some color indicator which is in decided contrast with the color of the paper itself. This assists materially in bringing out sharply the minute delineation of the finger prints. An absorbent pad 28 is utilized upon which the finger to be recorded is first impressed to moisten the same with whatever solution is utilized as a reagent for the indicator incorporated in the paper. Generically speaking, any of the well known types of color indicators such as litmus, Congo red, or phenolphthalein may be incorporated in the paper upon which the prints are to be recorded. Having in mind the particular indicator which has been incorporated or is to be incorporated in the paper a suitable reagent solution is utilized to saturate the finger pad of any desired type. This reagent may be either an alkaline solution or an acid solution, in either instance the solution being of a dilute nature, or in some instances it may be preferable to saturate the pad with a salt solution such as ferric chloride and utilize a reagent salt color indicator such as ferrocyanide in the paper.

The method will be apparent from the foregoing description. The finger to be recorded is first pressed upon a pad saturated with the desired solution and subsequently pressed firmly upon the recording surface which has incorporated therein the desired indicator. The chemical reaction between the indicator in the paper and the solution with which the finger has been moistened will bring out the color of the indicator to delineate sharply and accurately the contours in the finger surfaces. As hitherto suggested, it is desirable that the paper have incorporated therein a pigment to color the same in sharp contrast to the particular color of the indicator which is incorporated in the paper. This assists definitely in bringing out in sharp contrast the print of the finger.

Any of a number of chemical reagents may be utilized to carry out this improved process. The indicator incorporated with the paper may be any one of those hitherto listed or any one of various others. The indicator may well be sensitive to both acid and alkaline solutions to bring out the color print, as in the case of litmus or Congo red. The solution with which the pad is saturated for the purpose of moistening the finger to be recorded, if alkaline, may be a caustic soda solution or may contain ammonia, sodium phosphate, sodium carbonate, et cetera. If acid, the solution should preferably be a dilute hydrochloric or sulphuric mixture. Where salts of the iron group are utilized, ferric chloride being utilized to saturate the pad and ferrocyanide being incorporated in the paper, the chemical reaction produces a dark blue print upon the paper, commonly termed Prussian blue which is extremely satisfactory and durable.

The fingers are pressed against the saturated pad 28 and then pressed against the permanent coupon portion of the runner over the table 30. The runner is advanced and the corresponding detachable record coupon is removed and given to the insured. If a claim is made at some later date the permanent record coupon section of the runner which has been kept secure within the container against molestation is removed and the finger print compared with that of the claimant. As the runner is advanced over the table 30 it is led around the bent or curved ends of the table. The detachable coupons on the runner are however led over the straight edge 33 of the table where they are easily severed from the coupons which wind around the roll 34.

What I claim is:

1. A portable finger print machine of the character described comprising a box-like container, a finger print pad carried in one end of the container, a flat table portion carried in the other end of the container, said container having a transverse slot between the table portion and the finger print pad and a second slot on the opposite side of the table portion and adapted to be loaded with a continuous paper runner which extends upwardly through one of said slots and across said table portion and entering the interior of the container through the remaining slot, and means in the interior of said container controllable from outside the container for advancing a runner loaded in this manner over the table portion.

2. A portable finger print recording device comprising, in combination, a flat elongated case having a bottom, side and end walls and being of a size to lie flat in the palm of the hand, a roller journalled in the opposite side walls adjacent one end of the case, a table supported by the case and extending across the top side of the case and occupying substantially the top half section of the case adjacent to the end thereof in which the roller is disposed, the ends of the table in line with the longitudial axis of the case being unsupported and bent downwardly into the interior of the case, said case adapted to contain a runner of flexible material arranged so that it extends across the exposed surface of the table around the bent ends thereof and is attached to the roller for winding thereon when the latter is rotated in one direction, and a tray supported by the case and occupying substantially the remaining half section of the top side of the case, said tray adapted to contain finger print recording material disposed in said tray for fingerprinting on the runner.

3. A portable fingerprint recording apparatus comprising a flat elongated rectangular shaped case of a size and weight to be held with ease in the palm of the hand, said case having a hollow interior accessible from the outside into which is adapted to be loaded a flexible continuous runner capable of receiving and recording fingerprint impressions, a roller disposed in the case at one end thereof to which the runner is attached when properly loaded in the case, means operable from the outside of the case for rotating said roller and winding the runner thereon, a table supported by said casing occupying substantially one-half section of the top side of the case, said table having an exposed surface adapted to form a support for the runner across which it may be advanced when it is wound around the roller, a tray occupying substantially the remaining half section of the top side of the case, said tray adapted to contain material for forming a finger print impression on the runner loaded in the case.

4. A portable finger print recording apparatus comprising, in combination, a flat elongated casing of a size to fit in the palm of the hand, a roller carried by said case adjacent one end thereof, a table supported by the case on the top side thereof adjacent the end of the case in which said roller is disposed, said table having its opposite ends in line with longitudinal axis of the case free and bent downwardly into the interior of the case, a tray supported by the case on the top side thereof adjacent the end of the case opposite to that in which the roller is disposed and adapted to contain finger print material, means operable from the outside for rotating said roller, said case adapted to be loaded with a flexible runner capable of permanently recording a finger print impression, said runner when properly loaded adapted to extend across the table from the interior of the case around the bent ends thereof and adapted to be attached to the roller for winding thereon.

5. Apparatus of the character described comprising a portable elongated case, said case having a hollow interior to receive a flexible runner capable of receiving finger print impressions, a table occupying substantially one end section of the case and having a surface adapted to be exposed to view, the runner when properly loaded adapted to extend across said table, means for advancing the runner received in the hollow interior of the case across the top side of said table and causing at least a portion of the runner to re-enter the interior of the case, and a well occupying substantially the other end section of the case and adapted to be exposed to view, said well adapted to contain finger moistening material capable of forming a finger print impression on the runner.

6. A portable finger print recording apparatus comprising, in combination, a flat elongated container, a table supported by said container on the top side thereof and occupying a large portion of the top side adjacent one end of the container, the ends of the table in line with the longitudinal axis being free of support and being bent downwardly into the interior of the container, a roller rotatably supported by the container adjacent to and below one of said ends of the table, means operable from the outside of the container for rotating said roller, and a tray for holding finger print material supported by the container on the top side thereof and occupying a large portion of the top side adjacent the other end of the container, said apparatus adapted to be loaded with a continuous runner of flexible material having spaces provided for finger print impressions which is led over the free end of the table remote from said roller, thence across the table and around the opposite end thereof and into the interior of the container for attachment to said roller.

7. Apparatus of the character described comprising a portable hollow container, a table carried by the container having a surface adapted to be exposed to view, a roller mounted for rotation in the interior of the container, means controllable from outside the container for rotating said roller, said container adapted to hold a paper runner extending across the exposed surface of the table and attached to the roller, a well supported on said container alongside of said table and adapted to contain finger print material.

8. Finger print apparatus adapted for portable use comprising, in combination, a case having an opposite side and end walls and a bottom, a top member extending across the top side of the case and supported by the side and end walls thereof, said member having a pair of openings each occupying a large portion of the area of the top side of the case, a tray for holding finger print recording material having a size to fit into one of said openings, said tray provided with laterally extending flanges around the upper edges of the tray overlapping upon the top member and supporting the tray below the top surface of the member, a table supported by the case extending across from one side of the case to the other below the level of the top member and substantially closing the other opening in the member, said table having the opposite ends thereof parallel to the opposite ends of the case curled inwardly toward the interior of the case, and means in the interior of the case for advancing a continuous paper runner across the table and around the curled ends thereof.

9. A portable finger print machine for issuing insurance policies comprising, in combination, a box-like container of general rectangular dimensions of a size to fit in the palm of the hand, a tray containing finger print recording material occupying substantially a half section of the top side of the container, a table occupying substantially the remaining half section of the top side of the container, a roller disposed transversely across the container in the interior thereof below the table, said container adapted to hold a paper runner having a portion of its length extending over the table and attached to the roller and adapted to be advanced over the table when the roller is rotated in one direction, and means projecting through one side of the container to rotate said roller, said table serving as a support for any paper runner extending thereover upon which finger print impressions may be made.

10. A portable recording apparatus of the class described comprising a casing having a top, bottom and four sides, a pair of spindles mounted therein between which is adapted to extend a continuous runner which upon advancement is adapted to unwind from one spindle and wind on the other spindle, a supporting table adjacent the top of said casing over which such a runner is adapted to be advanced, the edge of the table from which such a runner leaves upon advancement thereover being provided with a rolled edge portion and a straight edge portion.

11. A portable recording apparatus of the class described comprising a flat rectangularly-shaped container, a pair of spaced spindles positioned transversely thereof, said spindles adapted to support a longitudinally perforated paper runner extending therebetween and adapted upon advancement to unwind from one spindle and wind on the other spindle, a supporting table adjacent said spindles over which such a perforated paper runner is adapted to be advanced in exposed condition, said table formed with a rolled edge and a straight edge along that portion of its length at which such a perforated runner leaves the table upon advancement whereby such a paper runner is readily severed along its longitudinal perforation.

12. Recording apparatus of the class described comprising a container adapted to receive a continuous runner of paper or like material comprising two longitudinal sections arranged within the container, one longitudinal section comprising detachable coupons and the other section comprising permanent record coupons, said container provided with a supporting table, mechanism for advancing such a runner over the table, said table provided with a rounded edge portion permitting the permanent record sections of such a runner to pass over the table and back into the container, and said table provided with a straight edge portion adjacent said rounded portion but extending therebeyond for preventing the detachable sections of such a runner from re-entering the container but forcing the same to be ejected from the container.

13. Apparatus of the character described comprising a portable case providing a space therein for receiving a flexible runner, a table in one half-section on the top side of the case, a tray in the other half section of the top side of the case and adapted to contain finger print material, narrow openings extending parallel to one another on opposite sides of said table, and means in the case for advancing a runner upwardly through one of said openings and across said table and returning at least part of the runner to the interior of the case.

ANDREW RAHN.